Jan. 28, 1958   C. R. HARRISON   2,820,998
MACHINE FOR MAKING SHELL MOLDS
Filed Oct. 12, 1953   5 Sheets-Sheet 1
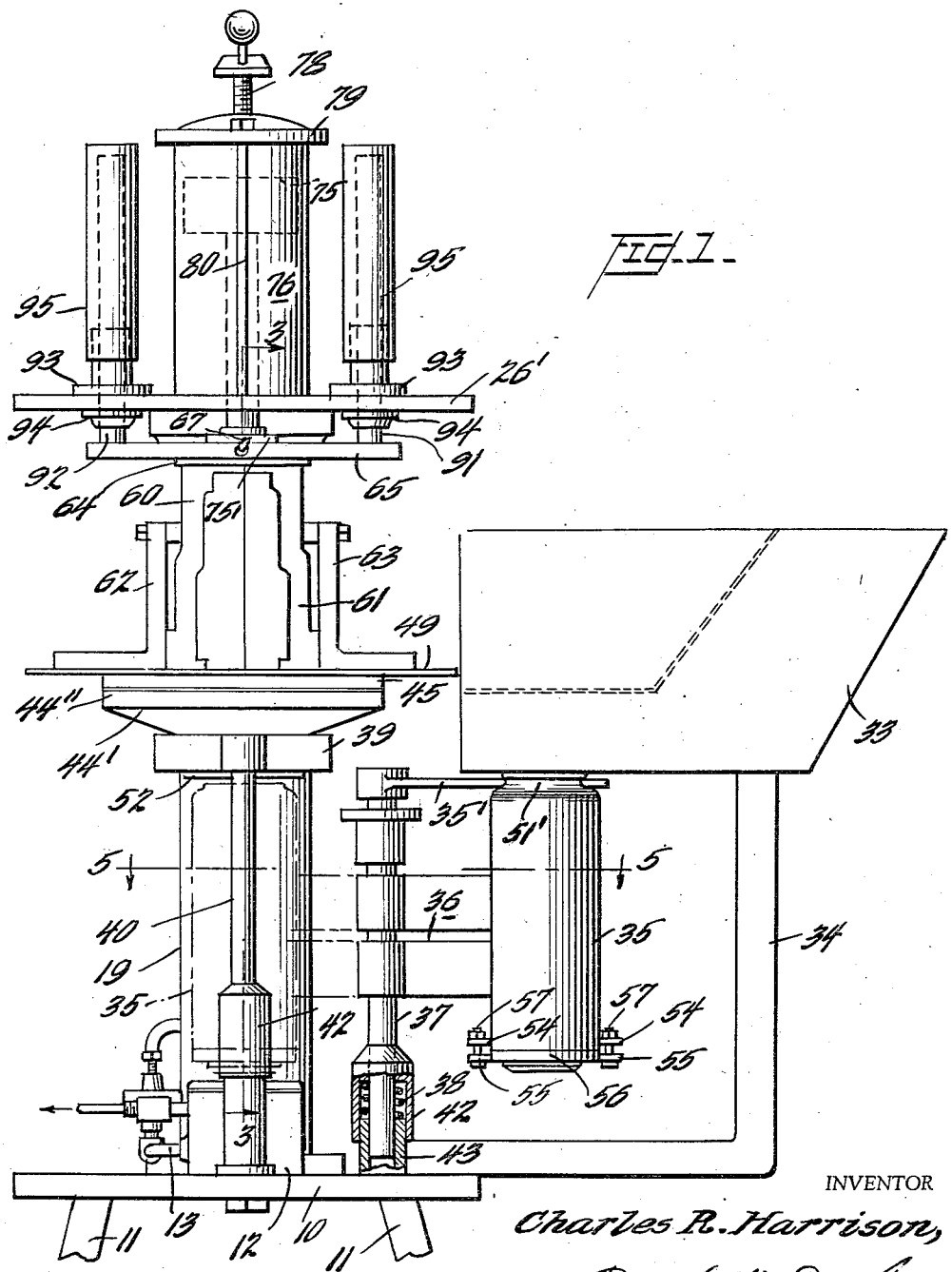
INVENTOR
Charles R. Harrison,
BY
ATTORNEY

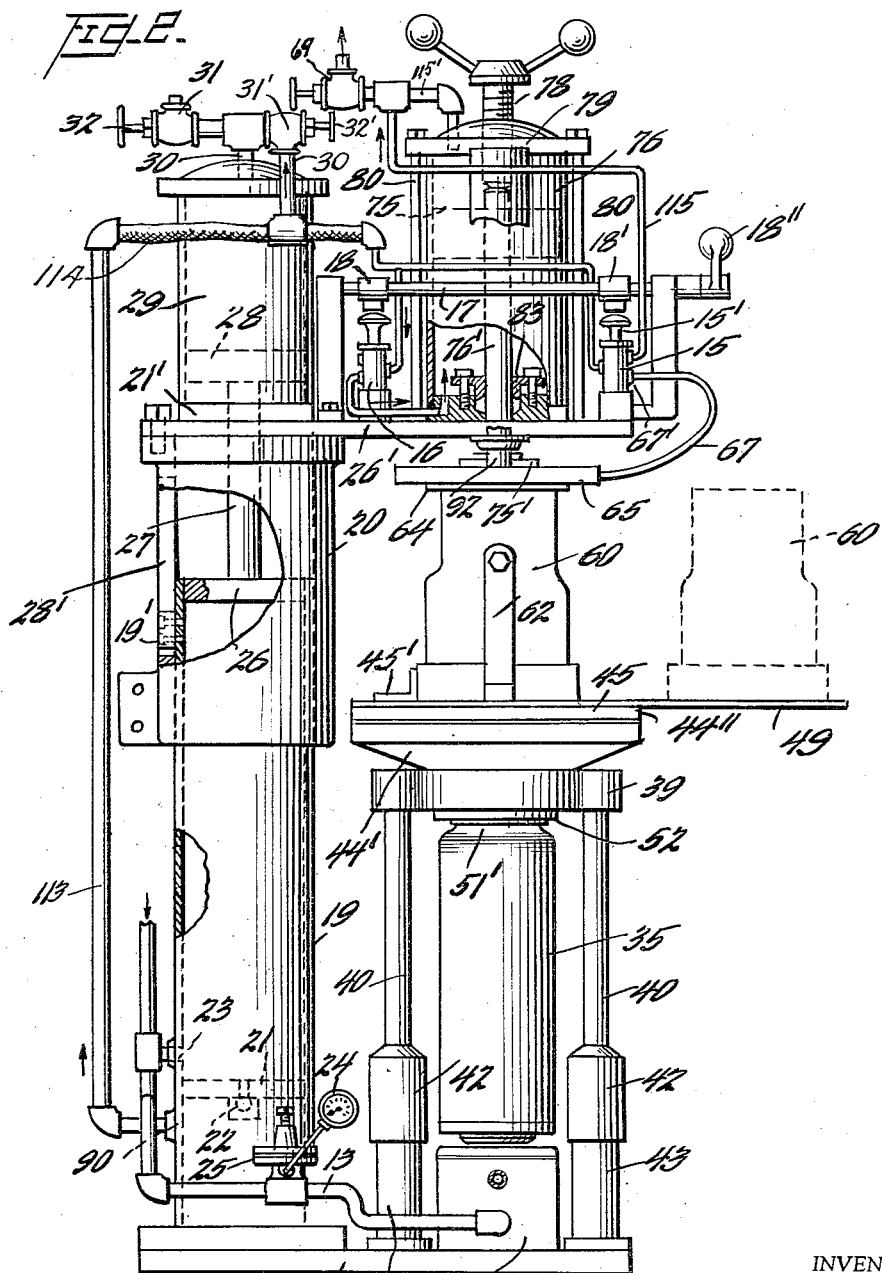

Jan. 28, 1958   C. R. HARRISON   2,820,998
MACHINE FOR MAKING SHELL MOLDS
Filed Oct. 12, 1953   5 Sheets-Sheet 3
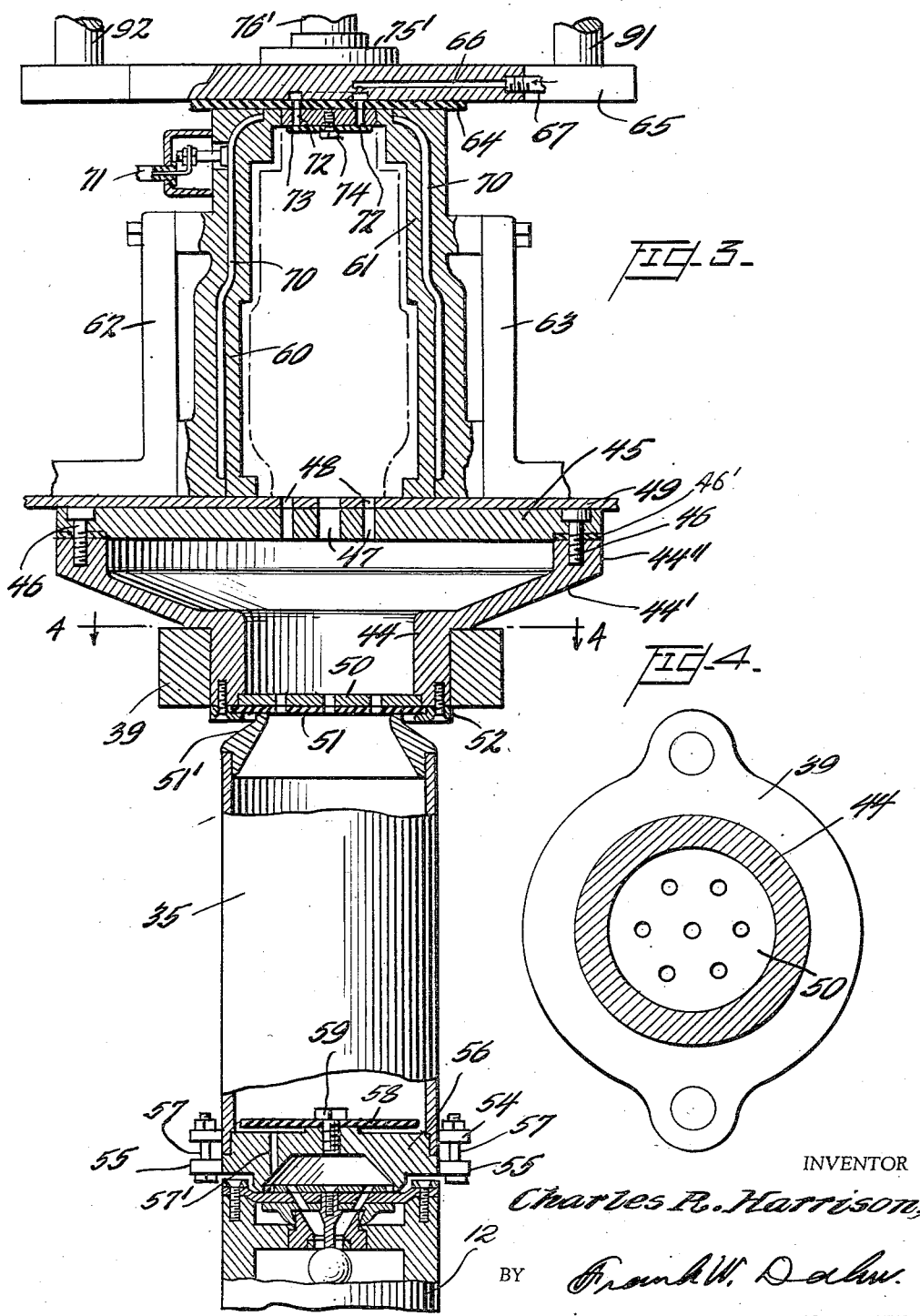

Jan. 28, 1958     C. R. HARRISON     2,820,998
MACHINE FOR MAKING SHELL MOLDS
Filed Oct. 12, 1953     5 Sheets-Sheet 4
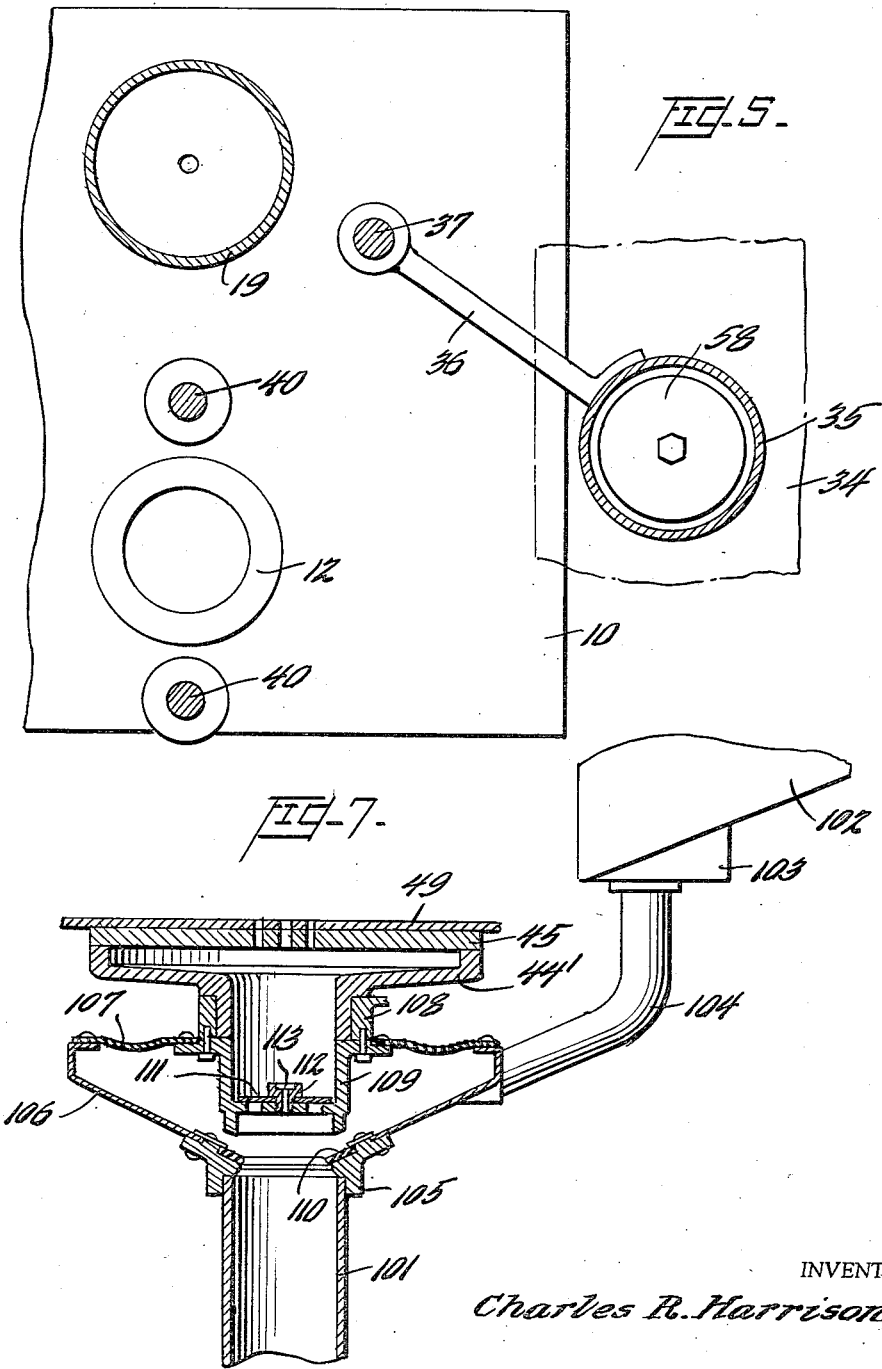
INVENTOR
Charles R. Harrison,
BY
ATTORNEY

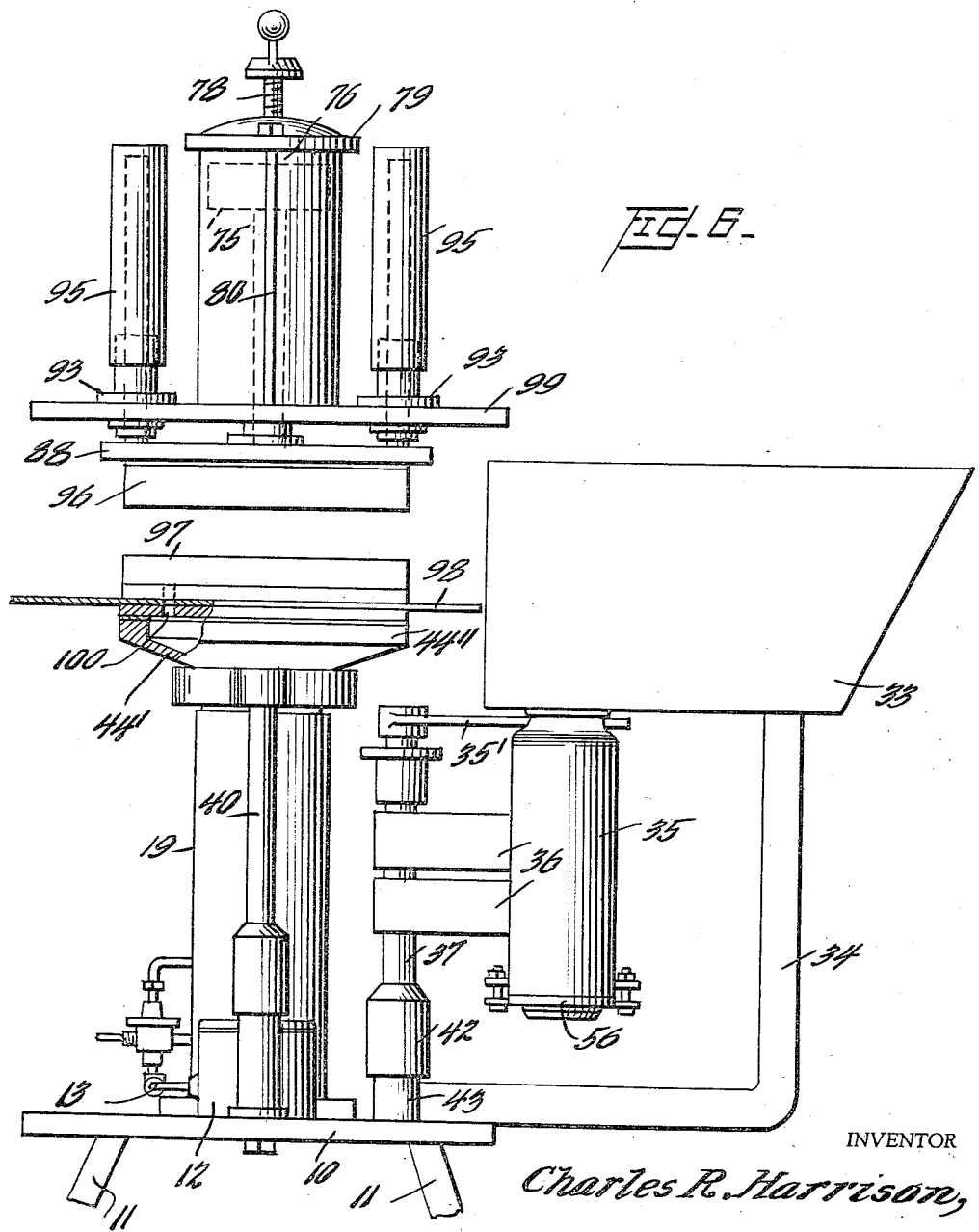

United States Patent Office 2,820,998
Patented Jan. 28, 1958

2,820,998

MACHINE FOR MAKING SHELL MOLDS

Charles R. Harrison, Wesleyville, Pa., assignor to Harrison Machine Company, Erie, Pa., a corporation of Pennsylvania Application October 12, 1953, Serial No. 385,519

20 Claims. (Cl. 22—36)

My invention relates to a machine intended primarily for forming shell molds from a mixture of sand and comminuted thermosetting material, but not necessarily limited to such use, since obviously the machine or parts thereof may be used with other materials and for other purposes. It is a main purpose of the invention to provide a machine for forming molds, which machine is inverted as compared with machines of conventional varieties, by which I mean that the material during the mold forming operation is blown upward from the bottom of the machine into the mold rather than downward from the top, as in known machines. By using such a machine various advantages are had, more especially for the forming of cores and shell molds from plastic materials and mixtures, as will appear upon consideration of the disclosure in this application.

Another object of the invention is to reduce waste of material by providing means for conveying material from a bin to the sand tube, and completely sealing the joint between the bin and the tube so that no material is lost or spilled on the floor. In forming shell molds and the like according to known methods, it has been customary to prepare a mixture of sand and a thermosetting resin and then to dump or blow the mixture against a heated surface of a pattern or core box to form a core of desired thickness, the resin being softened by the heat and the core becoming set by the adhesive action of the resin. The core thus formed is held in place for a few seconds if necessary, this dwell time permitting better pre-setting, and the shell molds are then removed from the pattern or core box, the loose portion of the mix, in which the resin has not reached plastic condition, falling off the shell mold. Then the shell is baked in a furnace to cure the resin permanently. After removal of the shells from the pattern or core box they are ready for use. The excess material may be shaken out of the pattern by hand before baking, but obviously that is a slow process, and therefore objectionable. By blowing the mixture upward into the mold, only so much of the material as adheres to the walls of the mold will remain in place, and the granular part that is not plasticised may be blown back into a sand tube or other receptacle, thus economizing material and also putting it back into position to be used in making the next casting.

Another object of the invention is to simplify the machine and reduce labor by providing a simple automatic feeder that speeds up the operation of the machine by the use of a continuous automatic feed for the sand mix. Thus the normal operations of the machine, namely, closing the mold or box, sealing the sand tube, sealing the blow head, and blowing are all accomplished in the blow position of the operating valve, while the operation of vibrating the mold, opening the mold box, and filling the sand tube from a bin, are all accomplished in the opposite or top position of the valve lever. Much time is saved, because the sand tube is being filled by gravity while the operator is removing the mold or core from the box and preparing for the next blow.

Another object is to provide a flexible seal for the top of the hopper leading from the bin to the top of the sand tube, so that any air trapped in the sand tube or sand feed and retrieve chamber can escape gradually without puffing through the hopper and carrying material out wtih it, but such material will be retained in the closed hopper for later re-use in forming other shell molds or other castings.

Anotoher object is to provide means and a method of casting shell molds or cores in upright position whereby the unused material may be returned out of the core box or pattern quickly and effectively.

Other objects are to prevent variation in the quality of the mix, by preventing adhesion of the mix to the walls of the various parts and maintaining a substantially constant forward feed of the materials.

To provide a machine with a sand bin in a low position so that the mix does not have to be lifted to a high hopper but can be run up a slight incline and dumped directly from a wheelbarrow into the hopper, thus saving labor.

To provide improved means in a sand tube to spread the entering mix and to check return of mix after the blow pressure has been released.

To provide a sand carrier with means to hold the mix and prevent its return to the sand tube to be mixed with new sand from the hopper or sand bin.

To provide air lifts for raising and lowering parts of the machine, thereby saving time and labor.

To provide a machine having means to make cores of hollow or shell type by the use of heat on plasticizable materials and means for blowing back out of the mold the portions of mix not solidified by the heat.

In general the purpose of the invention or inventions herein disclosed is to provide improved simplified means for making shell molds and the like with greater efficiency and speed and at less cost in time and materials than has heretofore been practicable.

Referring now to the annexed drawings, which are made a part of this specification and in which similar reference characters indicate similar parts;

Fig. 1 is a front elevation of the machine of my invention,

Fig. 2 is an elevation, looking at Fig. 1 from the left,

Fig. 3, a vertical section on line 3—3 of Fig. 1 (Figs. 1, 2 and 3 show the particular arrangement for the blowing of vertical cores, in which the center of the core can be blown out and back to the sand carrier, to lighten the core and to save material), Fig. 4, a horizontal section on line 4—4 of Fig. 3 (all of said figures showing a machine for blowing vertical cores or molds with blow back of excess material), Fig. 5, a horizontal section on line 5—5 of Fig. 1, Fig. 6 a vertical section of another form of the machine, with parts modified and/or added thereto, and shows hand feed and arranged for horizontal cores in the molds, Fig. 7, a partial vertical section of a modification for automatic feed, in place of hand feed as in Fig. 6.

In the drawings, reference character 10 indicates the base or platform of the machine, which is supported by legs 11. A blow head 12 is mounted on the base 10 and is connected by a pipe 13 to a source of compressed air. The hollow column includes a fixed lower part 19 and an upper movable part 20 that surrounds the upper end of part 19 and is slidable up and down thereon. The fixed lower part is divided into two chambers by a transverse partition 21 to form an upper chamber connected to air pressure pipe 13 by means of port 23, thus serving as a compressed air reservoir. A check valve 22 in partition 21 permits compressed air to pass downward and so maintains the pressure in the lower compartment uniform and unaffected by any drop in pressure, as in Harrison Patent No. 2,556,618. A suitable port (Fig. 2) connects pipe 13 to the blow head 12. A pressure gauge 24 is connected to a diaphragm 25 to indicate the pressure in the blow head 12.

The fixed column section 19 has fixedly attached thereto a head 26, extending upwardly from which is a stationary rod 27 bearing a piston 28, on which is slidably mounted a movable piston chamber or cylinder 29. The latter is fixed to a plate hereinafter termed top plate 26', attached to movable column section 20. Thus when air is admitted under pressure into cylinder 29 above stationary piston 28, cylinder 29 is raised carrying with it top plate 26' and movable column section 20. The chamber and the top plate move up and down but are held against rotation relative to the fixed column portion 19 by means of a spline 19' slidable in a slot 28' in said upper column portion 20. The top plate 26' carries various parts hereinafter described, and by vertical adjustment of said plate the machine can be adjusted for use of core boxes and paterns of various heights. By the use of an air lift for said parts, such adjustments can be made by unskilled persons or by persons handicapped by lack of strength or for other reasons, so that strong and skilled set-up men are no longer needed for this work.

Any suitable means may be adopted for manually controlling the admission and exhaust of air to and from piston chamber 29. As herein illustrated an exhaust valve 31 may be manually operated by means of hand wheel 32 and an air pressure admission valve 31' connected to pipe 30, flexible pipe 114 and air pressure pipe 113 may be manually operated by a hand wheel 32'. By properly manipulating these valves the attendant can set the position of top plate 26' at any desired level in accordance with the vertical dimension of the mold into which the sand mixture is to be introduced. By reason of the flexibility of connecting pipe 114, the movement of the top plate upward and downward to adjusted position is not impeded.

A sand bin or hopper 33 for hand feed only (Fig. 1) is mounted at one side of the base 10 by means of a bracket 34, and the bin has an outlet positioned to supply sand to a sand tube 35 when the same is swung into refilling position, i. e., the full line position of Fig. 1.

A sand tube 35 is supported above the level of the blow head 12 on arms 36 fixed to a rockshaft 37, said tube being swingable laterally from a position underneath the bin 33 to a position between the blow head and the mold, as in Patent 2,556,618, above referred to, and being normally elevated by a spring 38, as in said patent to clear the blow head when pressure is released so as to allow it to be swung into refilling position. Any suitable gate may be provided on an arm 35' to hold back the contents of the bin when the sand tube has been removed from under the sand bin 33, said gate preferably swinging automatically into closed position. A carrier support in the form of a yoke 39 is mounted on rods 40, said rods and yoke being forced upward by springs 38 (Fig. 1) enclosed in covering sleeves 42 that are slidable on short hollow posts 43 (Fig. 2) on base 10, the lower ends of the rods 40 being guided in holes in said posts.

A sand mixture feed and retrieve chamber (Figs. 1, 2, 3) is supported in the yoke 39, the chamber being formed with a depending neck portion 44 extending through the yoke and a funnel-shaped part 44' and having an upper ring 44" fixed to a blow plate 45 by screws 46 that pass through an insulating washer 46' held between blow plate 45 and ring 44" in Fig. 3. The blow plate has apertures 47 for passage of the sand mix. The apertures register with holes at 48 in a work table 49 of heat resistant material. The neck 44' fits in an opening in the yoke 39 and it has a circular recess to receive a perforated circular plate 50, below which there is a valve rubber sealing diaphragm 51 with perforations in registry with those of plate 50, both plates being held in place by a flanged collar 52 that is bolted to the neck 44. The holes in plates 45, 50, 51 and in table 49 are of such size that the mix of sand and comminuted or powdered thermosetting material such as is used in making shell molds can readily be blown up through said holes but very little will return through the small holes by gravity after the blow pressure is released. Thus, when air pressure is flowing from inside the mold 61, it will carry any loose sand back into the mixture chamber and since the sand used to form the core in the pattern is small compared to the volume of the mixture chamber, the mixture feed chamber is kept practically full at all times, and the sand tube can be returned to charging position without causing the mix to fall down from the sand feed and retrieve chamber. However, after the sand mixture has been blown upward into the mold pattern sufficiently to form the shell as above indicated, any surplus sand mixture remaining in the molded cavity may be readily blown back and retrieved in the sand feed and retrieve chamber and sand tube by a blast of air in the reverse direction from that which carried the material into the mold. A tapered ring 51' rests on the upper end of tube 35 and engages with the sealing diaphragm 51 during the blowing operation.

At the lower end of the sand tube there is a closure comprising perforated ears 54 on the tube and similar ears on an adapter 56 with alined bolt holes to receive bolts 57 for securing the adapter in place. The adapter 56 has a tapered lower end and an upwardly tapered recess at 56' in its lower face, with holes 57' extending vertically upward through the head from points in the inclined wall of the recess. A circular valve or spreader 58 of neoprene or like flexible material is secured to the top of the head 56 by a screw 59 in such position that it extends outward beyond the holes 57', to cause the mix to be thrown outward against the walls of the tube and evenly distributed about the same, without danger of blowing a hole through the center of the tube, or of adhering to the sides of the tube or building up to impede the flow of mix and so decreasing the capacity of the sand tube, and the valve 58 is spaced from the upper surface of the adapter by a central raised plateau on the adapter upon which plateau the valve rests. Thus the contents are held in the tube, the passages 57' affording ready passage into the tube but the material offering little chance of escape for the contents by reason of the overhang of the disk 58 beyond the holes 57'. It is to be understood that the contents may be a mix as above described, or sand alone, or may consist of other fluent materials.

A mold such as is preferred for use in preparing shell molds by the method of blowing a mixture of sand and thermosetting powder upward is shown in detail in Fig. 3, where the mold consists of two upright parts 60 and 61 held together by vise jaws 62, 63 to form a pattern or core box for forming a shell mold or hollow core. At their lower ends the mold parts stand on the work table 49 and the upper end of the mold is closed by a heat resistant plate 64 forming part of an upper blow plate 65 having an air passage 66 connected by a flexible tube 67 to an exhaust port 67'.

Air pressure operated means is provided for lowering the upper blow plate 65 so as to force down with it mold parts 60 and 61, blow plate 45, and yoke 39, carrying with it rods 40, against the tension of springs 38, disposed in sleeves 42. Thus, sand tube 35 is forced against the blow head 12 to open a blow valve device such as 52—67 shown in detail in Fig. 5 of my prior Patent 2,556,618 hereinabove mentioned.

The air pressure operated means comprises a piston 75 slidably mounted in a cylinder 76 carried on top plate 26'. A closure plate 79 is clamped to the top of the cylinder 76 by means of bolts 80 fixed to the top plate 26' and extending upwardly therefrom. A screw 78 threaded in closure plate 79 is adjustable to limit the upward movement of the piston 75. Depending downwardly from the piston 75 is a piston rod 76' slidable through a gland 83 disposed on the top plate 26' and connected at the lower end to the blow plate 65.

Suitable means is mounted on the top plate 26' for applying air pressure to raise and lower the piston 75 and, also, for forcing air through port 67' to blow back the surplus sand from the mold and to clear the vents in the blow plate 45 when the sand blowing operation is completed. Mechanism for this purpose comprises a control shaft 17 mounted in suitable bearings fixed on the top plate 26'. The shaft 17 may be oscillated by a handle 18" to operate cams 18' and 18 fixed on the shaft 17 in position to adjust valves 15 and 16 mounted on the top plate 26', respectively disposed in operative relation to the cams. The valve 15 is provided with a valve rod 15' which in one position serves to connect air pressure pipes 114 and 113 connected by port 90 to the lower chamber of cylinder 19 below transverse port 21. Thus, regulated pressure of the lower chamber of the cylinder 19 is introduced into the pipe 115 and connected to pipe 115' communicating with the cylinder 76 through an aperture in the closure plate 79 thereof. At the same time, cam 18 operates the valve rod of the valve 16 to exhaust the air from the cylinder below the piston 75. Thus, the piston 75 is forced downwardly, carrying with it the upper blow plate 65 and lowering the mold box and sand tube 35 to start the sand blowing operation above described.

Shortly thereafter, depending upon the thickness of mold shell desired, the handle 18" is swung in the opposite direction so as to release the valve rods of the valves 15 and 16, permitting their valve springs to return the rods into position wherein the valve 16 is in position to close off the exhaust and to apply air pressure from the pipe 114 to the lower chamber of the cylinder 76, tending to raise the piston 75, thus permitting the springs 38 to raise rods 40 so as to release the downward pressure on the sand tube 35. Thus, the blow valve in the blow head closes and the sand blowing operation is stopped.

Simultaneously with the application of air pressure by the operation of the valve 16 as above described, the valve rod 15' of the air valve 15 is released so as to permit its spring to return the same to a position in which the pressure from the air pressure pipe 114 is turned off and the air which was previously under pressure in the top chamber of the cylinder above the piston 75 is put into communication by means of the pipe 115 with the flexible pipe 67 communicating with the channel 66 in the upper blow plate 75. Thus, the air from the upper chamber of the cylinder is exhausted through ports 72 into the interior of the shell mold and blows out any residual sand which has not adhered to the pattern. At the same time, the passages 47, 48, and 51 are cleared of any sand particles which may have become lodged therein.

In order to prevent particles of sand from lodging in the channel 66 of the upper blow plate 65, the ports 72 leading from the channel 66 to the interior of the mold box are normally closed by a valve 73 consisting of a disk or flap of flexible material held at its center against the inner surface of the plate 65. The flexibility of the material of the disk or flap permits its yielding under pressure exerted by the air forced through the ports by the upward travel of the piston forcing out the air of the upper chamber of the cylinder when the air is exhausted therefrom through the pipes 115 and 67 as above described.

For heating the mold members 60 and 61, electric heating elements 70 are preferably embedded in the material of the members 60 nad 61 and are connected by wires 71 to any suitable source of electric current. Guide rods 91, 92 (Fig. 1) are movable with the upper blow plate 65 to hold it in a straight-line movement, said rods sliding in bearings 93 in top plate 26' and being provided with dust caps 94 at the lower side of the bearings. Elongated dust caps 95 protect the upper parts of guide rods 91, 92, said caps normally resting upon bearings 93.

Adjustable positioners and ejecting means may be provided for locating the molds on the work table, such, for example, as indicated at 45' in Fig. 2.

Should it be desired at any time to exhaust the air from the upper chamber of cylinder 76 independently of valve 15 as above described, valve 69, communicating with pipe 115' may be manually opened. In normal operation of the apparatus this valve remains closed.

The form of the invention shown in Fig. 6 is or may be identical with the form above described, except that it is devised to utilize a conventional horizontal core box, having a cope section 96 for making horizontal castings, and a drag section 97. The drag section 97 is fixed in place on a work table 98 and the cope section is secured to a top plate 99. The mix is blown into the core box through passages in the work table, as shown at 100.

Fig. 7 illustrates a form of the invention in which a stationary sand tube is substituted for the swinging sand tubes shown elsewhere, this sand tube being shown at 101, corresponding to tube 35 in Fig. 2. At its lower end the tube may engage a blow head (not shown) as in the other figures, it being movable up and down to a limited extent as in the other forms of the invention herein disclosed. The tube is connected to a material bin 102 by a permanent outlet 103 of any suitable or preferred character, leading into a length of hose or pipe 104, of which there are two at opposite sides of the tube, only one being shown here. The hose is flexible so as to permit the sand tube to move without damage to the connections to the bin.

At the top of the sand tube there is a ring 105 with an inclined surface to which is affixed a hopper 106 of thin metal, which has vertical sides and an inturned lip to which is attached the outer margin of a flexible diaphragm 107. The inner margin of the diaphragm is attached to a flange extending from the upper margin of a tubular member 109 disposed to form a continuation of the depending neck portion of the feed and retrieve chamber hereinabove described in the form illustrated in Figures 1–3. The extending flange is fastened to the lower end of the yoke 108 that supports the sand feed and retrieve chamber.

A sealing gasket 110 is mounted in a recess in the ring 105, and it will be evident that when the sand carrier 44' is in its raised position as shown in Fig. 7, there will be a space between the upper end of the tube and the lower end of casting 109 through which the mix may flow from the bin 102 into the sand tube 101, the parts being so proportioned that when the sand carrier is lowered the gasket will seal the passage from the bin and prevent any reverse flow of mix from the sand tube back to the bin 102, when not blowing. Vibrators may be provided to expedite the flow of mix if the incline of the hose is not sufficient to cause the mix to flow fast enough, the use of such vibrators being common in the art.

A flexible check valve at 111 is held in place by a screw 112 having a vent 113, said valve acting to spread the entering material and prevent sticking and also to prevent return flow of the mix to the sand tube after the mold has been filled.

It will be seen that by the use of the devices of Fig. 7 I have have provided a continuous automatic feed, so that the normal operations of the machine, to-wit, closing the mold or box, sealing the sand tube, sealing the blow head, and blowing the mix into the mold or mold box, can all be performed while the operating valve 18 is in the "blow" position, whereas vibration, opening of the mold or mold box, and the filling of the sand tube from the bin are all performed while the valve arm is in the opposite or upper position. Obviously there is a substantial saving of time by filling the sand tube by gravity while the other operations are proceeding, instead of waiting until after they have been performed.

The flexible diaphragm 107 closes the hopper and this, combined with the closing function of the sand tube relative to the bin 102 and pipes 104 prevents such waste as would otherwise occur by reason of material escaping and falling to the floor. By reason of the flexibility of the hose and diaphragm the sand tube can be moved freely up and down as necessary. The closing of the hopper by the diaphragm also prevents escape of any trapped air that might puff out and carry out loose dry material, all of which will be held inside the hopper.

In the operation of the machine when using a conventional horizontal core box as in Fig. 6, the box has its top half or cope member connected to vent plate 88, and has air vents of suitable character registering with one or more air passages in said plate for exhausting the air from the core cavity when blowing. The lower half or drag member is set loosely on the work table 98, directly under the cope member of the core box.

The column is raised or lowered by the air lift cylinder 29 to give sufficient room for operation of the core box and cores. The cylinder screw 78 is adjusted to give correct clearance between the core box members for ejecting the core by means not shown without more piston travel than is necessary, so as to conserve air in making the smaller cores by using less travel of the piston. Adjustable stops may be used at the rear and at one side of the drag for locating it underneath and in line with the cope. Holes, as at 109, Fig. 6 are formed in the drag, said holes continuing through the table 98 and the sand carrier as in Fig. 3.

The core box being in position and the machine adjusted for proper clearance, the air supply is turned on through the pipe 13, to the column 19 through the port 23 and directly to the blow head 12 by pipe 13 carrying full pressure as regulated in the blow head by diaphragm 25 according to the material used.

In blowing a core the rockarm lever 18" is pulled, admitting air into the top of cylinder 76 through pipe 115, closing the core box, compressing the spring 38, sealing the sand tube 35 at both ends, and pressing on the diaphragm in the blow head 12 until it opens the blow valve in said head as in Fig. 5 of my Patent 2,556,618, hereinabove mentioned, admitting the blowing pressure against the mix in the sand tube through the sand carrier and filling the core box.

Now the lever 18 is reversed, operating valve 16, which admits air to lift the piston 75 in cylinder 76 to free the cope section and to open the vibrator valve to vibrate the same as it is lifted off the core that remains in the drag. The drag is then pulled out to unloading position, and is hand operated, or is ejected by well known power-operated means.

The operation of the form of the machine shown in Figs. 1 to 5 being essentially the same no separate explanation is believed to be necessary.

It will be obvious to those skilled in the art that many changes may be made in the device and methods herein disclosed, all without departing from the spirit of the invention; and therefore I do not limit myself to what is shown in the drawings, and described in the specification, but only as indicated in the appended claims.

Having thus fully described my invention, what I claim is:

1. A machine for forming shell molds from a mixture of sand and particulate thermosetting material comprising; means for holding a heat conducting pattern on a perforated work table in a position wherein a cavity is formed between said pattern and said table; means for heating said pattern to a temperature sufficient to plasticize said thermosetting material and to build up a layer of a plasticized sand and thermosetting material mixture to adhere to said pattern upon contact of said mixture therewith; a sand tube or reservoir disposed below said table for holding a mixture of sand and particulate thermosetting material; a blow head disposed below said sand tube; means for introducing a blast of air from said blow head into said sand tube, to force said mixture upwardly through said perforations into said pattern cavity into contact with the heated surface of the pattern for a sufficient time interval to build up a thermosetting shell of desired thickness; and means for interrupting said air blast and introducing into said pattern cavity a scavenging air blast in a direction opposite to said first mentioned air blast, whereby any surplus sand mixture which has not adhered to the pattern is returned to the sand tube.

2. A machine for forming shell molds from a mixture of sand and particulate thermosetting particles as defined in claim 1 wherein the perforations in said work table are sufficiently small so that substantially no sand or granular particles are returned to the sand tube without the aid of said scavenging blast, said perforations being however sufficiently large to permit the sand mixture to pass through readily into said cavity by the force of said air blast from said blow head.

3. A machine for forming shell molds from a mixture of sand and particulate thermosetting particles as defined in claim 2, in which means is provided for relieving contact between said work plate and said sand tube, and means is included for replenishing the supply of the mixture in said sand tube while said pressure is relieved.

4. A machine as defined in claim 3, in which said replenishing means includes a supply bin, horizontally spaced from said sand tube, and means for moving the sand tube into replenishing position adjacent said supply bin and for returning the sand tube to its original position in registration with said work table and blow-head; said contact relieving means also including means for relieving contact of said sand tube with said blow-head.

5. A machine as defined in claim 1 in which a flexible spreader valve is secured within the sand tube adjacent the bottom thereof to cause the air blast to spread out to the interior surface of the tube to prevent the blast being confined to the center of the tube.

6. A machine as defined in claim 1, in which a blow plate is provided to make contact with the top of a pattern box containing said pattern and means for applying pressure to said blow plate so as to force contact of said work plate with said sand tube and thereby transmitting pressure to said sand tube to make contact with said blow-head.

7. A machine as defined in claim 6, in which a duct is formed in said blow plate, there being ports formed in said pattern box registering with said duct, and means for introducing air pressure through said duct into said cavity for scavenging the surplus mixture therefrom.

8. A machine as defined in claim 7, in which a flexible valve is provided in the interior of the pattern box to close said ports when the sand blast is introduced into said cavity and to permit entrance of the oppositely directed scavenging blast from said duct in said top blow plate.

9. A machine as defined in claim 1, in which a sand mixture feed and retrieve chamber is disposed between said perforated work table and said sand tube, said chamber having a perforated top wall in registration with the perforation in said work table and a perforated bottom plate disposed to contact the open top of said sand tube.

10. A machine as defined in claim 9 in which the perforations in said bottom wall of said chamber are sufficiently large to permit the entrance of the sand mixture propelled by said blast but too small to permit free return of said sand particles by gravity alone.

11. A machine as defined in claim 1, in which means is provided to resiliently hold said work table free from contact with said sand tube and said sand tube be normally held free from contact with said blow head, and means for moving said sand tube to a sand replenishing position and returning it to sand blowing position during the interval when said sand tube is free from engagement with the work table and blow head.

12. A machine as defined in claim 1, in which a feed and retrieve chamber is provided below said work table, the top wall of said chamber having perforations registering with the perforation in said work table, a supply bin for the sand mixture disposed adjacent to the sand tube, a hopper forming a continuation of a discharge conduit from said bin disposed at the top opening of said sand tube, a flexible disphram closing the top of said hopper and surrounding a lower portion of said chamber, the bottom edge of the vertical chamber wall being formed so as to register with the top opening of said sand tube and means for applying pressure to the pattern box and said work table to thereby lower said chamber to engage said bottom edge with the top margin of said tube so as to close off communication with said supply bin.

13. A machine as defined in claim 12 in which a flexible spreader valve is disposed within said chamber adjacent the bottom wall thereof to spread the sand mixture blown from the sand tube.

14. A machine as defined in claim 7, in which air pressure responsive means is provided for actuating said blow plate and air valve control means is provided for supplying air pressure to said responsive means to raise and lower said blow plate in coordination with control means for the air blast through said sand tube.

15. A machine as defined in claim 14, in which said air pressure responsive means includes a piston movable in a cylinder, means for connecting said piston with said blow plate, means for introducing air pressure to one side of the piston to raise said blow plate, and to the other side of the piston to lower said blow plate, and a conduit connecting the upper chamber of said cylinder with the duct in said blow plate to exhaust the air from above the piston through the mold cavity for scavenging the surplus sand mixture therefrom.

16. A machine for forming shell molds from a mixture of sand and particulate thermosetting material comprising: means for holding a hollow heat conducting mold on a perforated work table in a position wherein a cavity is formed between said mold and said table; means for heating said mold to a temperature sufficient to plasticize said thermosetting material and to build up a layer of plasticized sand and thermosetting material mixture to adhere to said mold upon contact of said mixture therewith; a sand tube or reservoir disposed below said table for holding a mixture of sand and particulate thermosetting material; a blow head disposed below said sand tube; means for introducing a blast of air from said blow head into said sand tube, to force said mixture upwardly through said perforations into said mold cavity into contact with the heated surface of the mold for a sufficient time interval to build up a thermosetting shell of desired thickness; means for resiliently supporting said sand tube away from said blow head; a plate disposed above the mold box containing said mold; air pressure means for raising and lowering said plate, said air pressure means comprising a cylinder mounted on a top plate, a piston working in said cylinder and provided with a piston rod sliding through said top plate and connected to said first mentioned plate, and further air pressure means connected to said top plate for adjusting the position of the same in accordance with the size of the mold box, and manual means for controlling the last mentioned pressure means.

17. A machine as defined in claim 16, in which said pressure operated adjusting means comprises a cylinder mounted upon said top plate and a stationary piston connected to a stationary support and means for introducing air pressure above said stationary piston and thereby to raise the corresponding cylinder and with it said top plate and to turn off said air pressure and open an exhaust valve to release the air from said cylinder so as to permit the lowering of said top plate by gravity to any desired position.

18. A machine for forming shell molds from a mixture of sand and particulate thermosetting material comprising: means for holding a hollow heat conducting mold on a perforated work table in a position wherein a cavity is formed between said mold and said table; means for heating said mold to a temperature sufficient to plasticize said thermosetting material and to build up a layer of a plasticized sand and thermosetting material mixture to adhere to said mold upon contact of said mixture therewith; a sand tube or reservoir disposed below said table for holding a mixture of sand and particulate thermosetting material; a blow head disposed below said sand tube; means for depressing the mold box and said work table against the mouth of said sand tube so as to cause the bottom of said sand tube to close on the blow head; an adjustable top plate carrying said depressing means in adjusted position corresponding to mold boxes of different sizes, and an operating cylinder for said depressing means carried by said top plate, a piston slidable in said cylinder engaging said depressing means, a source of pneumatic pressure, means mounted on said top plate operable to control connections from said pressure means to said cylinder for lowering and raising said piston, said lowering of the piston causing depression of the mold box and sand tube and operating said blow head to introduce a blast into said sand tube to force said mixture upwardly through said perforations into said mold cavity into contact with the heated surface of the mold for a sufficient time interval to build up a thermosetting shell of desired thickness; the return of said depressing means causing interruption of said air blast and permitting the return of any surplus sand mixture from the mold cavity.

19. The machine recited in claim 2 wherein means is provided for replenishing the supply of the mixture in said sand tube.

20. The machine recited in claim 19 wherein said replenishing means comprises means to move said sand tube and said work table relative to each other.

References Cited in the file of this patent

UNITED STATES PATENTS

| | | |
|---|---|---|
| 1,480,750 | Demmler | June 15, 1924 |
| 1,492,355 | Campbell | Apr. 29, 1924 |
| 2,556,618 | Harrison et al. | June 12, 1951 |
| 2,636,231 | Dougherty | Apr. 28, 1953 |
| 2,687,559 | Peterson | Aug. 31, 1954 |
| 2,688,780 | Anderson | Sept. 14, 1954 |
| 2,724,878 | Valyi | Nov. 29, 1955 |

FOREIGN PATENTS

| | | |
|---|---|---|
| 674,422 | Great Britain | June 25, 1952 |
| 689,535 | Great Britain | Apr. 1, 1953 |